United States Patent [19]

Carratt et al.

[11] Patent Number: 5,544,272
[45] Date of Patent: Aug. 6, 1996

[54] OPTICAL FIBER CABLE AND AN ASSOCIATED METHOD OF MANUFACTURE

[75] Inventors: Michel Carratt, Houilles; Michel de Vecchis, Vaureal, both of France

[73] Assignee: Alcatel Cable, Clichy Cedex, France

[21] Appl. No.: 354,154

[22] Filed: Dec. 6, 1994

Related U.S. Application Data

[62] Division of Ser. No. 285,287, Aug. 3, 1994.

[30] Foreign Application Priority Data

Aug. 4, 1993 [FR] France ................... 93 09615

[51] Int. Cl.⁶ .................................. G02B 6/02
[52] U.S. Cl. .................................. 385/128
[58] Field of Search ................... 385/128–132, 385/123, 141, 142; 427/60, 163.2, 166, 249, 255; 65/421, 32.4, 431, 432, 435, 530, 537

[56] References Cited

U.S. PATENT DOCUMENTS

| | | | |
|---|---|---|---|
| 3,775,075 | 11/1973 | Keck et al. | 385/123 X |
| 4,735,856 | 4/1988 | Schultz et al. | 385/128 X |
| 4,874,222 | 10/1989 | Vacha et al. | 385/141 X |
| 5,157,755 | 10/1992 | Ooe et al. | 385/128 |
| 5,259,060 | 11/1993 | Edward et al. | 385/102 X |

FOREIGN PATENT DOCUMENTS

| | | |
|---|---|---|
| 0245752A2 | 11/1987 | European Pat. Off. . |
| 0432931A1 | 9/1991 | European Pat. Off. . |
| 2109581 | 6/1983 | United Kingdom . |

OTHER PUBLICATIONS

"Microbending Losses for Weakly Guiding Single–Mode Fibers", *IEEE Journal of Quantum Electronics*, vol. 28, No. 6, Jun. 6, 1992, pp. 1429–1434.

*Primary Examiner*—Akm E. Ullah
*Attorney, Agent, or Firm*—Sughrue, Mion, Zinn, Macpeak & Seas

[57] ABSTRACT

The present invention relates to an optical fiber comprising an optical core surrounded by optical cladding, said optical cladding being surrounded by a substantially hermetic coating, wherein said optical fiber has a mode field diameter lying in the range 7 μm to 9 μm at around 1550 nm, and a cutoff wavelength that is less than or equal to 1.35 μm.

9 Claims, 1 Drawing Sheet

OPTICAL FIBER CABLE AND AN ASSOCIATED METHOD OF MANUFACTURE

This is a divisional of application Ser. No. 08/285,287 filed Aug. 3, 1994 now is pending.

The present invention relates to an optical fiber, in particular for a use in a cable for a distribution network.

BACKGROUND OF THE INVENTION

Optical fiber cables enable data to be transmitted under excellent conditions and over ever increasing distances.

Until now, use thereof has been mainly restricted to long-distance transmission, in inter-city and inter-exchange networks. At present, attention is being paid to using them in distribution networks, and even within buildings and residential areas, particularly in the context of developing integrated services digital networks (ISDN).

Unfortunately, conventional optical fiber cable structures are adapted to inter-city and inter-exchange networks and are more suitable for fibers in small to medium numbers, whereas an optical fiber cable for a distribution network needs to have a much larger number of optical fibers than is required for long distance transmission, since it is necessary to take account of a multiplicity of subscriber terminations (in practice, the number of optical fibers in such a cable may lie in the range a few hundreds to a few thousands), yet the cable must nevertheless be sufficiently compact to enable it to be installed in ducts of very small diameter.

Optical fiber cables presently in use for long distance transmission are of two types.

A first type of optical fiber cable is of a structure that is "cellular" or "loose", i.e. it includes one or more elements in the form of a grooved rod or in the form of a tube in which optical fibers are housed. In order to reduce the bending and microbending to which the optical fibers are subjected, and which give rise to increases in attenuation, the optical fibers are left free and a certain amount of excess length is provided within the grooves or the tube.

It will readily be understood that in order to leave room to take up the excess lengths of the fibers, such a structure requires a very large ratio between the section of the cable as a whole and the sum of the sections of the individual optical fibers included therein. A structure of that kind is therefore quite unsuitable for use in a distribution network since cable sections would then be prohibitive, given the very large number of optical fibers that a cable must contain in order to be used in such a network.

A second type of optical fiber cable has a "ribbon" structure, i.e. the optical fibers are disposed parallel to one another and they are held together by a protective coating of resin. Cables of that type are more compact and less bulky, since there is no need to provide for excess lengths of fiber. Nevertheless, the ribbon structure is better adapted to connection of all the fibers simultaneously and that can give rise to problems in a distribution network. In a distribution network, it is necessary to provide for continuous evolution in the topology of the network, and that requires a ribbon to be split up, which operation is difficult to make compatible with the constraints of simultaneous connection since it does not provide sufficient flexibility.

In both cases, the optical fibers are responsible for the fact that presently existing optical fiber cable techniques are ill-suited to use within a distribution network. Indeed the use of either a loose structure or a ribbon structure is necessary to prevent the fiber from undergoing excessive bending or microbending and mechanical efforts to which the cable is submitted.

OBJECT AND SUMMARY OF THE INVENTION

The object of the present invention is to remedy those drawbacks by proposing an optical fiber that allows the optical cable in which it is used to satisfy the constraints inherent to use within a distribution network, and that is capable of including a large number of fibers.

To this end, the present invention provides an optical fiber comprising an optical core surrounded by optical cladding, said optical cladding being surrounded by a substantially hermetic coating, wherein said optical fiber has a mode field diameter lying in the range 7 µm to 9 µm at around 1550 nm, and a cutoff wavelength that is less than or equal to 1.35 µm.

It is known that optical fibers subjected to bends and microbends suffer from penalties of reduced lifetime and of increased transmission losses due to an increase in attenuation.

By choosing a mode field diameter in the range 7 µm to 9 µm at around 1550 nm, and a cutoff wavelength for each of the optical fibers that is less than or equal to 1.35 µm, improved transmission is ensured, i.e. losses are reduced, thereby avoiding the penalty of bends and microbends.

The mechanical tensile or compressive efforts which the cable including the fibers undergoes entail a decrease of the mechanical properties of the fibers, and thus a reduced lifetime of the fibers too.

By providing the optical fibers with a thin hermetic coating (thus not significantly increasing the bulk thereof), their lifetime is increased and so the first penalty of bends and microbends is avoided.

The sensitivity of optical fibers to bends and microbends is thus reduced, thereby avoiding the need to use excess lengths and loose structures. It is thus possible to use optical fibers in structures of the same type as those used for electrical distribution cables, thereby achieving a high degree of compactness compared with loose structure optical fiber cables, while nevertheless making connections easy compared with ribbon optical fiber cables.

Thus, because of the invention, the effects of bends and microbends are reduced not by resorting to structures of large diameter or of ribbon structure, but by acting directly on the optical fibers. The combination of a novel optical fiber structure and a cable structure of the same type as that which is used for electrical distribution, as made possible by the increased ability of the optical fiber to withstand bends and microbends and mechanical efforts, makes it possible to implement a cable that is particularly compact and adapted to use in distribution networks, to the same extent as are electrical cables having the same structure.

Finally, the effect of implementing a plastics coating around each optical fiber is firstly to protect its surface treatment and secondly, while the coating is being extruded, to enable the fiber coated in this way to be identified since the number of available color combinations is greater than when coloring a primary fiber coating in the form of a resin. Identifying and finding each fiber within a cable is thus made easier, and this is of crucial importance during installation and connection of the cable in which the fibers are used. In previously known optical fiber cables the number of colors that could be used for the primary resin coating of the fibers has been relatively limited.

It may be observed that extrusion of the coating of plastics material on the optical fiber is possible because the fiber has been made less sensitive to bending and to microbending.

The choice of a thin plastics coating also makes it possible to limit the amount of bending or microbending that is applied to the fiber.

BRIEF DESCRIPTION OF THE DRAWINGS

In the accompanying drawings given by way of non-limiting example.

In all of the figures, common elements are given the same reference numerals.

MORE DETAILED DESCRIPTION

An optical fiber of the invention is described below with reference to FIGS. 1 to.

An optical fiber of the invention may present a combination of all or some of the following features:

the fiber has a small mode field diameter lying in the range about 7 μm to 9 μm for a wavelength close to 1550 nm, so as to withstand bending and microbending, which corresponds to an index profile that is easy to make, e.g. $\Delta n = 6 \times 10^{-3}$ to $8 \times 10^{-3}$;

treatment is performed on or in the outer silica layer to obtain adequate lifetime under difficult conditions: the fiber then becomes a "hermetic" type fiber;

a thin plastics coating is applied directly on the fiber made in this way (by extrusion or by some other coating process) and it is colored for identification purposes.

Figure 2:
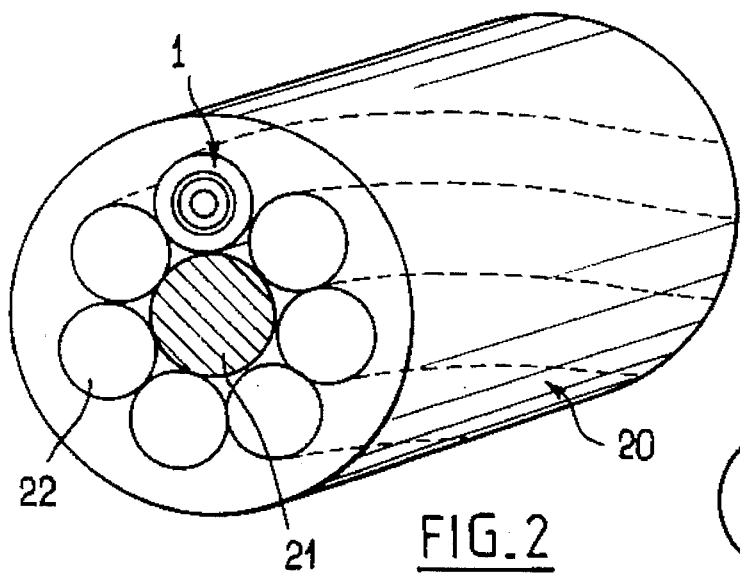
FIGS. 2 and 3 comprise two examples of index profiles for the fibers used in a cable of the invention.
Figure 5A:
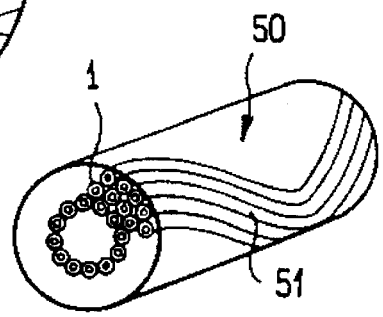
Figure 3:
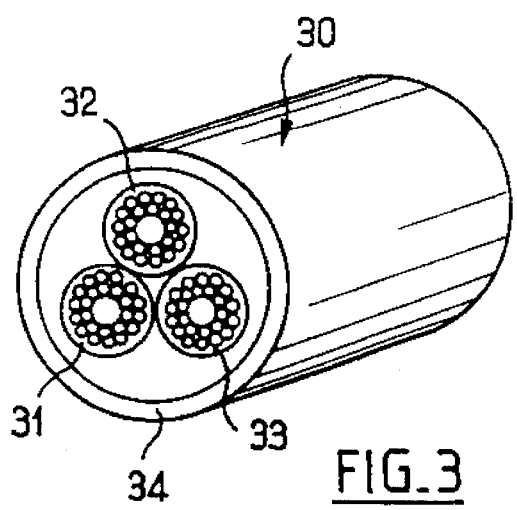
Figure 5B:
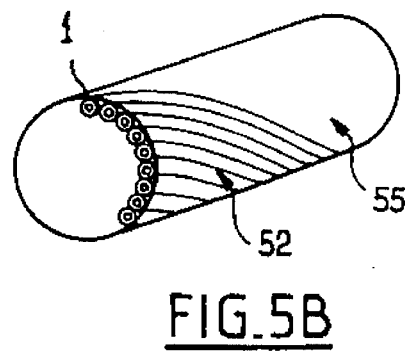

More generally, at around 1550 nm, the mode field diameter of fibers of the invention lies in the range 7 μm to 9 μm, and the cutoff wavelength of each of the fibers is less than or equal to 1.35 μm, and is preferably about 1.33 μm. Two non-limiting examples of index Profiles enabling the above feature to be obtained are shown in FIGS. 2 and 3, in which the differences Δn between the refractive indices of the various portions of the optical fiber and of the cladding immediately surrounding the core are given as a function of distance d from the axis of the fiber, where a is the radius of the core of the optical fiber.

Figure 1:
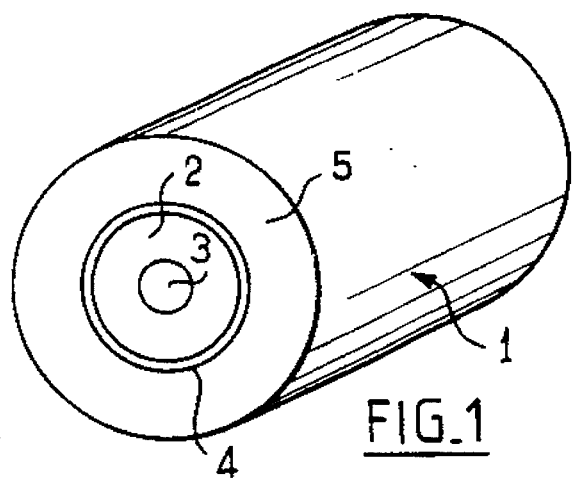
FIG. 1 is a perspective view of an optical fiber in accordance with the invention.
Figure 4:
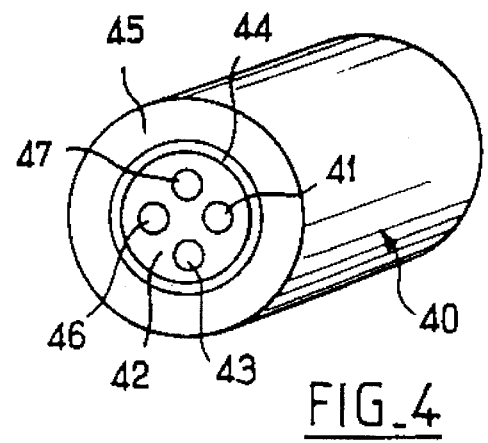

With reference to FIG. 1, an optical fiber 1 has silica optical cladding 2 that conventionally surrounds the propagation optical core 3. The cladding is initially subjected to treatment 4 that may be constituted by surface treatment, e.g. based on titanium oxide or on adding a coating layer of carbon, for example, said treatment being designed to increase the lifetime of the fiber. The above coating is very thin, being about 0.5 μm thick, for example.

All of the silica layers that may surround the optical core are referred to as the "optical cladding" and they are given an overall reference numeral 2 in order to simplify the description. However, it will naturally be understood that the optical cladding may be complex (in particular as shown in FIGS. 6 and 7) in order to obtain desired properties, and the cladding is not necessarily constituted by a single layer of silica around the optical core.

A plastics coating 5 is formed on the previously treated fiber. The function of the coating 5 is to protect the treatment 4. It also serves to contribute to identifying different fibers within a cable by means of color codes. Identification is of great importance for cables implemented in a distribution network. The coating is preferably provided by extrusion so as to maximize the number of color combinations that can be provided, but it could be provided by some other coating process.

Fibers treated and coated in this way can then be assembled together, in a structure that is tight or loose, and hellically or lengthwise, optionally around a central reinforcing element.

The plastics coating made on the treated fiber, either by extrusion or by some other coating process must be as thin as possible in order to minimize bulk and increase the number of fibers within a cable of given diameter. The plastics coating performs two functions, namely that of protecting the treatment performed on the outer layer of silica of the fiber, and that of identification by means of an appropriate color code. This identification function is essential for cables used in a distribution network. The technique of coating by extrusion makes it easy to implement marking by color coding the plastics coating. It should be observed that the technique of coating by means of a resin is less well adapted to providing identification by multiple color codes.

As an example of a particular embodiment, the following dimensions may be mentioned:

diameter of the fiber 1 over the optical cladding 2: 125 μm±3 μm;

thickness of the carbon coating 4: 0.5 μm;

thickness of the plastics coating 5 of the fiber: about 200 μm;

mode field diameter $2W_0$ at 1550 nm: 7.5 μm $\leq 2W_0 \leq$ 9 μm; and cutoff wavelength $\lambda_c$: 1200 nm $\leq \lambda_c \leq$ 1280 nm ($\lambda_c$ is always less than or equal to 1350 nm).

Naturally the invention is not limited to the examples described above, and numerous modifications can be applied to said examples without going beyond the ambit of the invention.

Thus, it is possible for the outside diameter of the silica fiber to be around 80 μm to 100 μm, and various different types of treatment may be applied to the outer surface of the silica layer.

We claim:

1. Optical fiber comprising an optical core surrounded by optical cladding, said optical cladding being surrounded by a substantially hermetic coating, wherein said optical fiber has a mode field diameter lying in the range 7 μm to 9 μm at around 1550 nm, and a cutoff wavelength that is less than or equal to 1.35 μm.

2. Optical fiber according to claim 1 wherein said substantially hermetic coating is surrounded by a coating of plastics material.

3. Optical fiber according to claim 1 wherein said substantially hermetic coating is made of carbon.

4. Optical fiber according to claim 1 wherein said hermetic coating comprises titanium oxide based doping of said optical cladding.

5. Optical fiber according to claim 2 wherein said coating of plastics material is made by extrusion or by a coating process.

6. Optical fiber according to claim 2 wherein said plastics coating includes identification information for identifying said fiber.

7. Optical fiber according to claim 1 wherein said substantially hermetic coating has a thickness of about 0.5 μm.

8. Optical fiber according to claim 2 wherein said coating of plastics material has a thickness of about 200 μm.

9. Optical fiber according to claim 1 wherein said mode field diameter lies in the range 7.5 to 9 μm and said cutoff wavelength lies in the range 1.2 to 1.28 μm.

* * * * *